Sept. 4, 1956     D. G. RENNO     2,761,183
VENTILATOR WINDOW ASSEMBLIES
Filed Nov. 9, 1953     2 Sheets-Sheet 1
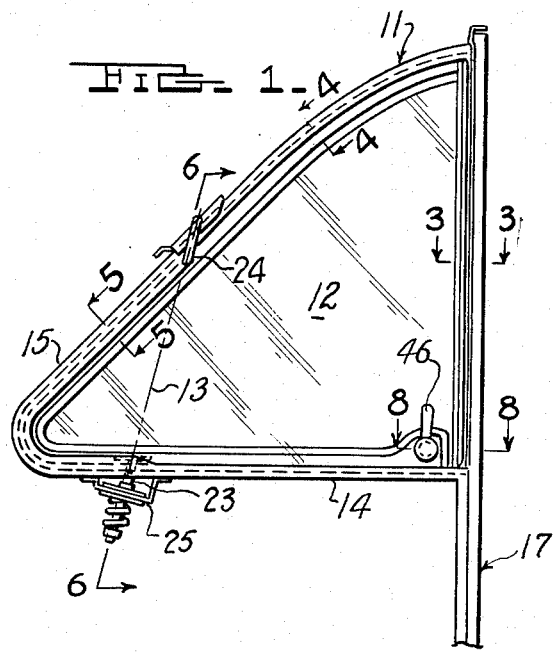
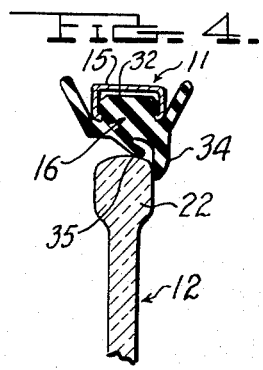
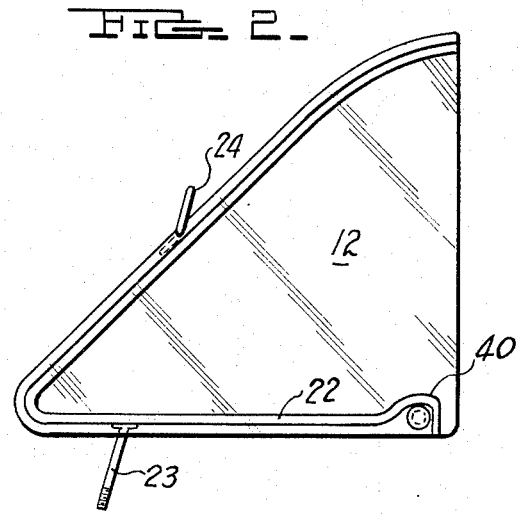
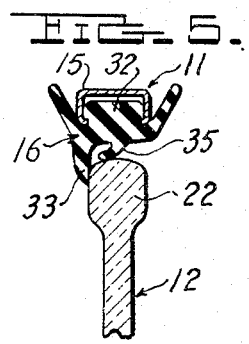
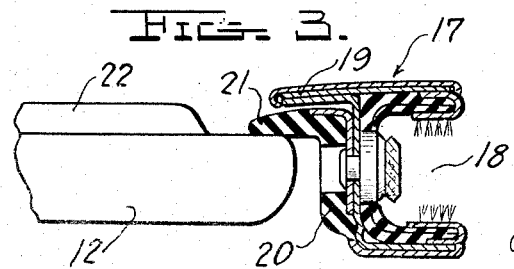
INVENTOR.
Donald G. Renno
BY
Whittemore, Hulbert & Belknap
ATTORNEYS Sept. 4, 1956 D. G. RENNO 2,761,183
VENTILATOR WINDOW ASSEMBLIES
Filed Nov. 9, 1953 2 Sheets-Sheet 2
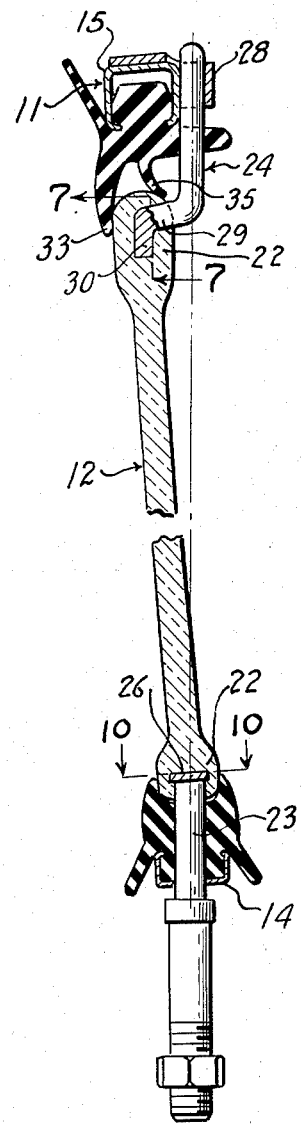
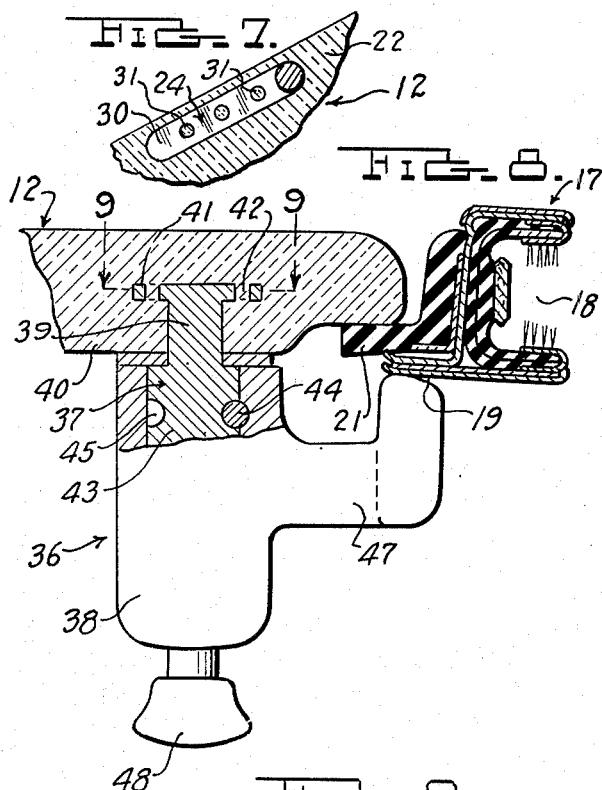
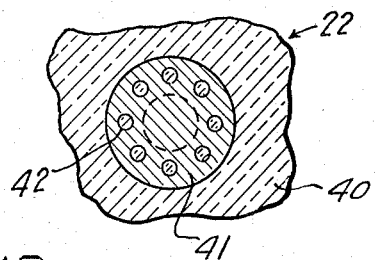
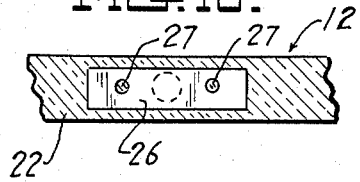
INVENTOR.
*Donald G. Renno*
BY
*Whitmore, Hulbert & Belknap*
ATTORNEYS

United States Patent Office 2,761,183
Patented Sept. 4, 1956

2,761,183

VENTILATOR WINDOW ASSEMBLIES

Donald G. Renno, Birmingham, Mich., assignor to Motor Products Corporation, Detroit, Mich., a corporation of New York Application November 9, 1953, Serial No. 390,839

14 Claims. (Cl. 20—53)

This invention relates generally to vehicle body ventilator windows and refers more particularly to improvements in windows of the above type having a panel usually supported by a frame in the front part of the window opening for swinging movement about a substantially vertically extending axis.

Ventilator windows of the above general type, in addition to having a fixed frame, also have a supporting retainer channel secured to certain marginal edges of the pivoted panel by a sealing strip extending lengthwise of the retainer channel within the latter and folded around the adjacent marginal edges of the pivoted panel. The retainer channel and sealing strip add considerably to the cost of manufacture of ventilator window assemblies not only due to the actual cost of these items but also due to the equipment and time required in assembling the same with the pivoted panel.

With the above in view, it is an object of this invention to appreciably reduce the cost of ventilator window assemblies by eliminating the supporting retainer channel and the associated sealing strip aforesaid. In accordance with this invention, the pivoted panel has marginal edges that are enlarged in thickness and cross section relative to the body portion of the panel and that are unsupported by the usual retainer channel. In the present invention, the pivot pins for mounting the panel on the fixed frame, as well as the operator for the panel, are anchored directly to the enlarged marginal edges of the panel.

It is another object of this invention to provide a ventilator window of the above type wherein the pivot pins as well as the support for the panel operator are embedded within the enlarged marginal portions of the panel and are integrally secured thereto.

The foregoing as well as other objects will be made more apparent as this description proceeds especially when considered in connection with the accompanying drawings, wherein:

Figure 1 is a side elevational view of a ventilator window assembly embodying the features of this invention;

Figure 2 is a side elevational view of the transparent panel for the window assembly;

Figures 3, 4, 5 and 6 are respectively sectional views taken on the lines 3—3, 4—4, 5—5 and 6—6 of Figure 1;

Figure 7 is a sectional view taken on the line 7—7 of Figure 6;

Figure 8 is a sectional view taken on the line 8—8 of Figure 1;

Figure 9 is a sectional view taken on the line 9—9 of Figure 8, and

Figure 10 is a sectional view taken on the line 10—10 of Figure 6.

The ventilator window assembly selected for the purpose of illustration comprises a frame 11 and a molded ventilator panel 12 supported within the frame for swinging movement about a substantially vertically extending axis 13. As shown in Figure 1 of the drawings, the axis 13 of swinging movement of the panel 11 is located intermediate the front and rear edges of the panel in a manner such that the front portion of the panel moves inwardly and the rear portion moves outwardly upon swinging movement of the panel from its closed position to its open position.

The frame 11 of the window assembly has a bottom bar 14 and a front bar 15 which extends rearwardly and upwardly from the front end of the bottom bar 14. Both of the above bars are channel-shaped in cross section and provide a substantially continuous inwardly opening channel for receiving a weatherstrip 16. The rear ends of the frame bars 14 and 15 are connected by a vertically extending bar 17 having a rearwardly opening channel 18 for slidably receiving the front edge portion of a vertically movable glass panel, not shown herein. Referring now to Figure 3 of the drawings, it will be noted that the bar 17 is provided with a vertically extending forwardly projecting flange 19 at the inner side of the bar. The flange 19 forms a recess with the base of the channel shaped bar 17 and a vertically extending weatherstrip 20 is positioned within this recess. The weatherstrip 20 is secured to the bar 17 and has a forwardly projecting lip 21 positioned to overlie the inner side of the panel 12 adjacent the rear edge of the latter when the panel is in its closed position, as shown in Figure 3 of the drawings.

The ventilator panel 12 is formed of a transparent moldable material such, for example, as glass and is shaped to correspond to the opening formed by the frame bars 14, 15 and 17. In other words, the transparent panel 12 is of a shape to close the opening defined by the frame 11 when the panel is swung to its closed position. The marginal edge portions of the transparent panel 12 adjacent the frame bars 14 and 15 are enlarged in cross sectional area to form a bead 22 which extends continuously along the bottom and front marginal edges of the panel 12. As shown in Figures 4 and 5 of the drawings, the marginal enlargement or bead 22 is symmetrical with respect to the median plane of the panel 12 and opposite sides of the bead 22 have surfaces lying substantially parallel to the median plane of the panel 12. The marginal enlargement or bead 22 is of a nature to impart ample strength to the panel 12 without the assistance of the usual glass retaining channel and the sealing strip or liner for said channel.

It has previously been stated that the transparent panel 12 is mounted on the frame 11 for swinging movement about the axis 13. For accomplishing this result, a pair of aligned pivot pins 23 and 24 are provided. The bottom pin 23 has the lower end rotatably supported on the bottom bar 14 of the frame 11 by a bracket 25 and has the upper end projecting into the bead 22 on the adjacent marginal edge of the panel 12. As shown in Figures 6 and 10 of the drawings, a plate 26 is secured intermediate the ends thereof in abutting relationship to the upper end of the pivot pin 23. The plate 26 is embedded within the bead 22 and has openings 27 therethrough for reasons to be presently described.

The upper end of the pivot pin 24 is journaled in a bearing 28 secured to the top bar 15 of the frame 11 and the lower end of the pivot pin 24 is offset laterally outwardly as indicated by the numeral 29 in Figure 6 of the drawings. The offset portion 29 projects into the enlargement or bead 22 and has an extension 30 embedded in the bead 22. As shown in Figure 7 of the drawings, the extension 30 of the pivot pin 24 has a plurality of openings 31 therethrough similar to the openings 27 in the plate 26 at the top of the bottom pivot pin 23.

In practice, the two pivot pins 23 and 24 are molded in place within the enlargement or bead 22 at the time the panel 12 is molded so that the plate 26 and the extension 30 are embedded within the bead or enlargement 22. Also, during the molding operation, portions of the panel material flow through the openings 27 and 31 in the plate 26 and extension 30 respectively so that the pivot pins are in effect keyed to the enlargement or bead 22.

The clearance space between the enlargement or bead 22 and the adjacent bars of the frame 11 is sealed by the weatherstrip 16. The weatherstrip 16 has a base 32 which is seated within the channel of the adjacent frame bars and is secured to the latter. As shown in Figure 5 of the drawings, the base 32 of the weatherstrip 16 has a flexible lip 33 which extends forwardly from the pivot pin 23 around the weatherstrip to the pivot pin 24 and is positioned to engage the outer surface of the adjacent bead 22 when the ventilator panel 12 is closed.

Referring now to Figure 4 of the drawings, it will be noted that the base 32 of the weatherstrip 16 is fashioned with a second flexible lip 34 which extends rearwardly from the top pivot pin 24 to the end of the frame bar 15 and is arranged to engage the inner side of the adjacent bead 22 when the ventilator panel 12 is in its closed position. In accordance with conventional practice, a third lip similar to the lip 34 extends rearwardly from the bottom pivot 23 and engages the inner surface of the adjacent bead 22 of the ventilator panel 12 when the latter is in its closed position. Referring again to Figures 4 and 5 of the drawings, it will be noted that the weatherstrip 16 has an additional lip 35 which extends for substantially the full length of the weatherstrip and is positioned to engage the outer edge of the bead 22 of the ventilator panel 12 when the latter is in its closed position. It will be noted from Figure 6 of the drawings that the weatherstrip is suitably apertured to provide for extending the respective pivot pins 23 and 24 therethrough.

The ventilator panel 12 is swung about the axis 13 by an operator 36 which projects inwardly from the ventilator panel 12 adjacent the rear edge of the latter. In detail, the operator 36 comprises a support 37 and a latch member 38 rotatably mounted on the support 37. The support 37 has a reduced part 39 which projects into an enlarged portion 40 of the bead 22 and terminates in a disc portion 41 of increased diameter. The disc portion 41 is embedded within the enlarged portion 40 of the bead 22 between opposite sides of the bead and is formed with a plurality of circumferentially spaced openings 42. In practice, the support 37 is molded in place in the enlargement 40 of the bead 22 during molding of the ventilator panel 12 so that the supporting member 37 is integrally connected to the ventilator panel 12. Also, during the molding operation, material flows through the openings 42 and as a consequence, movement of the supporting member 37 relative to the ventilator panel 12 is prevented.

The supporting member 37 has a cylindrical portion 43 which projects perpendicular to the ventilating panel 12 and forms a bearing on which the latch member 38 is rotatably mounted. The latch member 38 is rotatably secured to the supporting member 37 by a pin 44 which extends through the latch member 38 and engages in an annular groove 45 formed in the cylindrical portion 43 of the supporting member 37. The latch member 38 has an operating handle 46 and has a projection 47 arranged in one rotative position of the latch member 38 to engage the inner side of the vertical frame bar 17. In accordance with conventional practice rotation of the latch member 38 to its release position requires subsequent manipulation of a suitable catch 48. The catch 48 is indicated in Figure 8 of the drawings but is not shown in detail because it forms no part of the present invention.

It follows from the foregoing that the present invention renders it possible to produce a commercially practical ventilator window assembly wherein the usual glass retaining channel and sealing strip are omitted. Hence, the cost of manufacture of the ventilator window assembly is substantially reduced. Moreover, the above results are accomplished by the present invention without sacrificing performance or durability since the marginal enlargement or bead 22 on the panel imparts ample strength to the latter.

What I claim as my invention is:

1. A ventilator window assembly comprising a frame defining an opening, a transparent panel supported on the frame in said opening for swinging movement about a substantially vertical axis positioned between the front and rear edges of the panel, said panel having unsupported marginal edges enlarged in thickness and cross section, a weatherstrip of resilient material carried by the frame and having a flexible lip projecting into the opening, said lip being positioned to abut the outer surface of the enlarged marginal edge of the panel at the front side of the axis of swinging movement of said panel, and additional weather sealing means carried by the frame and positioned to engage the inner surface of the enlarged marginal edge of the panel at the rear side of the axis of swinging movement of the panel.

2. A ventilator window assembly comprising a frame defining an opening, a transparent panel positioned within the opening and having unsupported marginal edges enlarged in thickness and cross section, means pivotally supporting the panel on the frame for swinging movement about a substantially vertical axis positioned between the front and rear edges of the panel, said means comprising aligned pivot pins having their inner ends anchored on the enlarged marginal edges of the panel and having their outer ends rotatably engaging said frame, and weatherstrip means carried by the frame and having portions engageable with the enlarged marginal edges of the panel in the closed position of the latter.

3. The structure defined in claim 2 wherein the inner ends of the pivot pins project into the enlarged thickness of the marginal edges of the panel between opposite sides of said enlarged marginal portions and are integrally secured to the latter by the material from which the panel is formed.

4. The structure defined in claim 2 wherein the panel comprises a moldable transparent material, and wherein the inner ends of the pivot pins have parts embedded within the enlarged marginal portions of the panel and have openings in said parts for receiving moldable material.

5. The structure defined in claim 4 comprising an operator for the panel, and means supporting the operator including a part projecting into the enlarged marginal portion and embedded within said portion.

6. A ventilator window assembly comprising a frame defining an opening and having a bottom bar and a front bar extending upwardly from the front end of the bottom bar, a transparent panel for the opening having a bottom marginal edge extending along the bottom frame bar and having a front marginal edge extending along the front frame bar, said marginal edges being enlarged in thickness and in cross section to provide an integral bead extending continuously along the marginal edges aforesaid, means pivotally supporting the panel on the frame for swinging movement about a substantially vertical axis, said means comprising aligned pivot pins having their inner ends respectively embedded within the enlarged bead and integrally secured to the latter, means on the frame bars respectively rotatably engaging the outer ends of the pivot pins, and weatherstrip means carried by the frame and extending along the frame bars for engagement with the bead on the panel in the closed position of said panel.

7. The structure defined in claim 6 comprising an operator carried by the transparent panel and having a supporting part integrally secured to the panel within the thickness of said enlarged bead.

8. The structure defined in claim 7 wherein the panel is of molded glass and wherein the portions of the pivot pins and supporting part projecting into the bead each have openings for receiving the panel material during molding of said panel.

9. A ventilator window assembly comprising a frame defining an opening, a transparent panel supported on the frame in said opening for swinging movement about a substantially vertical axis, said panel having unsupported marginal edges enlarged in thickness and cross section, and a weatherstrip of resilient material carried by the frame and adapted to marginally engage the panel to effect a weather seal when the panel is in a closed position.

10. A ventilator window assembly comprising a frame defining an opening, a weatherstripping mounted by said frame to extend in said opening, a transparent panel swingable in said opening about a substantially vertical axis located rearwardly of a forward intermediate margin of said panel, and means to pivot said panel in said opening including separate axially aligned pivot elements secured to said panel adjacent each peripheral extremity of said intermediate margin, said margin being unsupported and its edge being forwardly exposed between said pivot elements, said margin and weatherstripping being in directly overlapped engagement over the length of said exposed edge, said pivot elements of said panel pivoting means being in embedded relation to said panel at said margin thereof.

11. A window assembly in accordance with claim 10 in which the forward margin of said panel is of enlarged and thickened cross section, as compared with the remaining section thereof, and the pivot elements of said panel pivoting means are in embedded relation to said enlarged cross section.

12. A window unit for use in a ventilator window assembly characterized by a frame defining an opening, said unit comprising a transparent panel adapted to be mounted to pivot in said opening about a substantially vertical axis located rearwardly of a forward intermediate margin of said panel, and means to pivot said panel including separate axially aligned pivot elements secured to said panel adjacent each peripheral extremity of said intermediate margin, said margin being unsupported at its edge and being forwardly exposed substantially the entire distance between said pivot elements, said panel margin being of enlarged and thickened cross section as compared with the remaining section thereof.

13. A window unit for use in a ventilator window assembly characterized by a frame defining an opening, said unit comprising a transparent panel adapted to be mounted to pivot in said opening about a substantially vertical axis located rearwardly of a forward intermediate margin of said panel, and means to pivot said panel including separate axially aligned pivot elements secured to said panel adjacent each peripheral extremity of said intermediate margin, said margin being unsupported at its edge and being forwardly exposed substantially the entire distance between said pivot elements, said panel margin being of enlarged and thickened cross section as compared with the remaining section thereof, and the pivot elements of said panel pivoting means being in embedded relation to said enlarged cross section.

14. A ventilator window assembly comprising a frame defining an opening, a molded transparent panel within said opening, said panel having a central body portion of substantially uniform thickness throughout its area and having enlarged unsupported marginal portions of greater thickness and cross section than said body portion, means pivotally supporting the panel on the frame for swinging movement about a substantially vertical axis, said means comprising substantially aligned pivot pins having portions embedded within the enlarged unsupported marginal portions of the panel and having other portions rotatably connected to said frame, the embedded portions of said pivot pins being provided with means having apertures receiving the molded material of said panel.

References Cited in the file of this patent
UNITED STATES PATENTS

| | | |
|---|---|---|
| 764,991 | Diaz | July 12, 1904 |
| 1,755,292 | Gagnon | Apr. 22, 1930 |
| 1,973,219 | Mooney | Sept. 11, 1934 |
| 2,596,356 | Ackermans | May 13, 1952 |
| 2,606,059 | Wernig | Aug. 5, 1952 |